(12) United States Patent
Hu

(10) Patent No.: US 7,941,769 B1
(45) Date of Patent: May 10, 2011

(54) METHOD AND APPARATUS FOR INTEGRATED CIRCUITS DESIGN SECURITY

(76) Inventor: Guoan Hu, Andover, MA (US)

( * ) Notice: Subject to any disclaimer, the term of this patent is extended or adjusted under 35 U.S.C. 154(b) by 990 days.

(21) Appl. No.: 11/729,371

(22) Filed: Mar. 28, 2007

(51) Int. Cl.
*G06F 17/50* (2006.01)
(52) U.S. Cl. .................. 716/101; 716/104; 716/126
(58) Field of Classification Search .................. 716/101, 716/104, 126
See application file for complete search history.

(56) References Cited

U.S. PATENT DOCUMENTS

2004/0075747 A1* 4/2004 Silverbrook ............. 348/207.99
* cited by examiner

*Primary Examiner* — Thuan Do

(57) ABSTRACT

An embodiment of the present invention provides a design specification to provide both design and manufacture security without increasing the chip area or reducing the chip performance. The invention employs "free" encryption and uses flash memory or anti-fuse technology for the security implementation. This secure methodology could be embedded into any RTL synthesis tool, or be created in a stand-alone tool. For a RTL netlist, some registers are selected as the candidates for the "secure cells", and all "secure cells" must have only one output. A random key will be generated (we call it the "real key") to decide whether each register is to be inverted or not. All "secure cells" will be mapped to the special registers in the technology library.

1 Claim, 6 Drawing Sheets

METHOD AND APPARATUS FOR INTEGRATED CIRCUITS DESIGN SECURITY

BACKGROUND

1. Field of the Invention

The present invention relates to techniques of design security for integrated circuits (IC), especially the secure synthesis. Specifically, the present invention relates to the protection of the intellectual property (IP) of the IC designs from third party foundries via a "free" encryption.

2. Related Art

With higher mask costs and increasing minimum lot sizes—the two economical trends of the semiconductor industry—most IC design companies are fabless companies, and their designs must be manufactured by third party foundries. Outsourcing manufacturing to low-cost providers overseas will save millions of dollars per chip-design. However, unscrupulous manufacturers with access to ASIC mask sets may "overbuild" chips and sell the excess to the black market, with implications reaching as high as national security. Even the design cycle could now be outsourced to third parties. For instance, a company could outsource the physical synthesis to a third party. For some extremely sensitive designs, it is necessary to limit the number of people who has access to the real functional designs, even within the same IC design company.

The best so far solution to address this manufacture outsourcing issue is adding a manufacturing security system with sophisticated hardware blocks to a customer's chip design at every level of the production cycle, referencing [1]. Thus, only chips that have been through the correct production cycle will work, and the fabless design companies can protect their IP during the manufacture.

However, the technology in [1] has to add extra hardware, like decryptors, onto the chip, which will not only make the formal verification impossible and the simulation complex, but will also increase the chip area and reduce the chip performance. Furthermore, solution in [1] does not address the issue of protecting the IP during the design stage.

SUMMARY

An embodiment of the present invention provides a design specification to allow both design and manufacturing security, without increasing the chip area or reducing the chip performance. The invention employs "free" encryption, flash memory, or anti-fuse technology for the security implementation. This secure methodology could be embedded into any RTL synthesis tool or built as a stand-alone tool. For a RTL netlist, some registers are selected as candidates for "secure cells", and all these "secure cells" must have only one output. A random key will be generated (we call it the "real key") to decide whether each register will be inverted or not. All "secure cells" will be mapped to special registers in the technology library. Each "secure cell" has a programmable switch that decides to connect to "Q" or "$\overline{Q}$" of the register according to the key, and an inverter will be inserted if it will be connected to "$\overline{Q}$". This inverter will be totally absorbed during the logic synthesis. After the RTL synthesis, a "fake key" and "fake simulation vectors" will be generated for going onto the design process, manufacture verification, and testing. When the chip is returned from the foundry, the "real key" will be injected, and the "programmable switches" in the "secure cells" will be reprogrammed before shipping the chip to the end users, so that before the switches are terminally programmed, the chip does not function correctly. Because the IC design company only hands the "fake key", "fake simulation vectors", and "fake netlist" to the third party, no authentication is needed during the whole design process, and hence a reduced risk of information leakage.

Cracking the "real key", or switch-pattern directly is as difficult as cracking of the AES and DES of the same bit-width.

Cracking the input pattern ("Q" or "$\overline{Q}$" pattern) from the logic function is not possible.

Because there are only about several hundred "programming switches" in the whole design, there is almost no extra area cost. The performance effect will be very minute because only one more local switch is added. If a timing-driven "secure cell" selection scheme is used, we can always select non-critical cells as "secure cells" so that there is no performance effect.

Because the "fake key", "fake simulation vectors", and "fake golden netlist" are provided, there are no issues with simulation, formal verification, and testing.

An extra advantage of the "fake simulation vectors" is that a third party won't have the slightest ideas about the behavior of the chip.

In a variation on this embodiment, the "secure cell" could be any primary input of the RTL netlist, like input pads or pad registers.

In a variation on this embodiment, the "programming switches" can be any switches other than flash memory. It could even be anti-fuse switches, SRAM based switches, or pass-transistors.

In a variation on this embodiment, the "secure cells" could be the normal flip-flops, or gates, and the "programming switches" could be embedded in a so-called "key box".

BRIEF DESCRIPTION OF THE FIGURES

FIG. 3 illustrates the basic schematics of the "secure synthesis".

DETAILED DESCRIPTION

Semiconductor companies increasingly outsource manufacturing in order to improve bottom line profitability and to remain focused on core competencies. Unfortunately, this cost-saving is sometimes offset by the very real possibility that the IP will find its way to the gray market. The gray market costs fabless chip design companies millions of dollars in lost revenue.

According to a recent FSA poll, 84% of respondents from the fabless design industry are "very concerned" about IP. Industrial research from KPMG and the Alliance for Gray Market and Counterfeit Abatement (AGMA) shows that gray market sales of IT products account for over $40 billion in revenue each year. This costs IT manufacturers up to $5 billion annually in lost profits.

Figure 1:
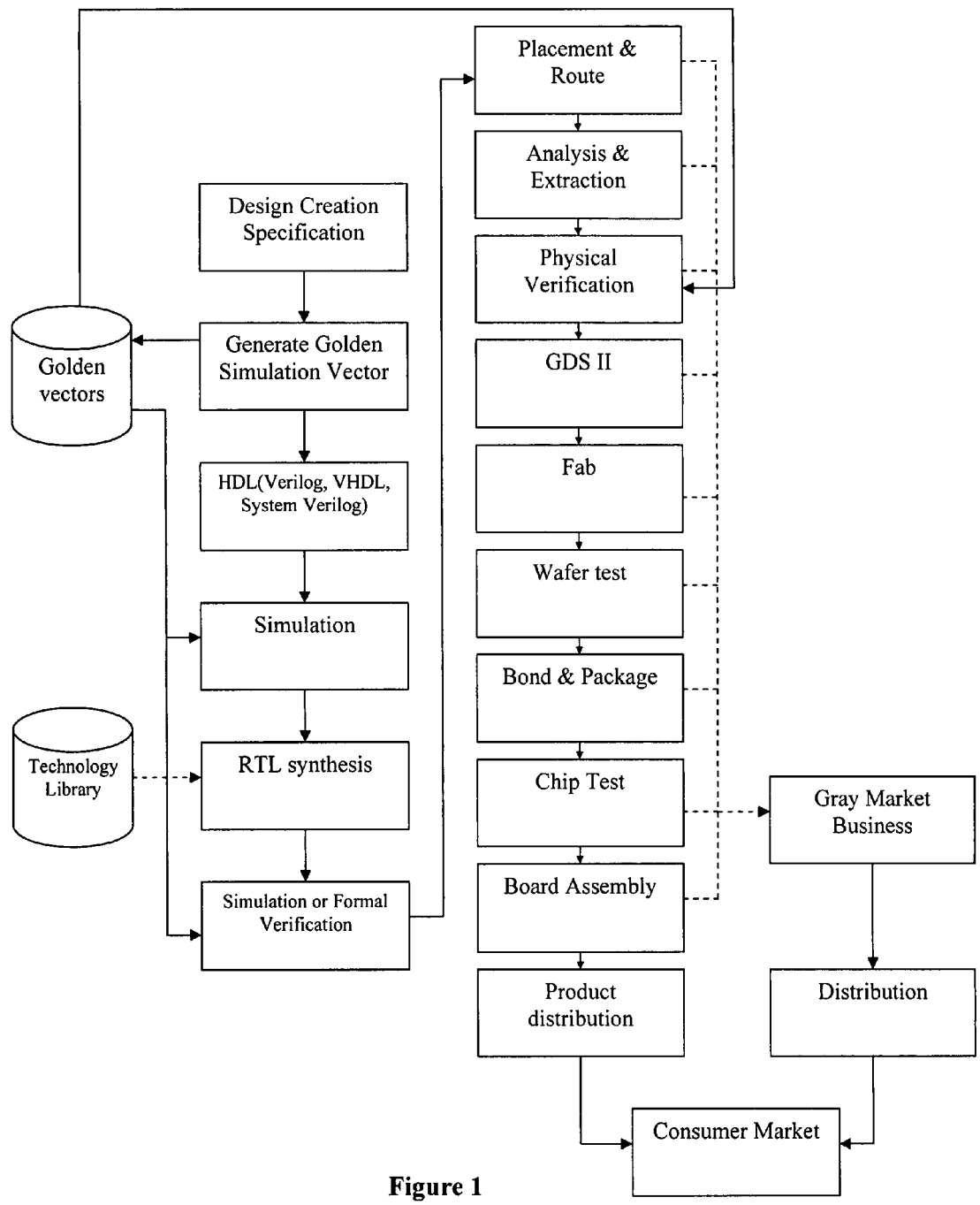
FIG. 1 illustrates an exemplary IC chip design and manufacture flow, with an illustration of how third parties or their employees may supply a gray market with working chips.

FIG. 1 illustrates an exemplary IC chip design and manufacture flow, and how their employees or third parties may supply a gray market with working chips. The core value of the IP is its design creation. The gray market could pilfer the IP at any stage, which ends up pitting the IC design companies to compete against the lower-cost versions of their own products.

[1] provides manufacture security by embedding security hardware into the IC design, to protect the IPs from the outsource foundries. In this design flow, the key is injected during the different process stages. Without the authenticated key injection, the chip will be unusable.

The present invention proposes an IC design security technology. It will be described with a design example.

The following is a simple Verilog code of an IC design:
module simple_design (a, clk, rst, z);
input clk, rst;
input [2:0] a;
output z;
reg [2:0] g;
wire h;
reg z;
always @(posedge clk or posedge rst)
begin
if (rst)
   z=1'b0;
else
   z=h;
end
always @(posedge clk or posedge rst)
begin
if (rst)
   g=3'b000;
else
   g=a;
end
assign h=!g[0] & !g[1] & !g[2]\g[0] & g[1] & !g[2];
endmodule
The golden simulation vectors are (with "clk" and "rst" omitted for simplicity):

| a[0] | a[1] | a[2] | z |
|---|---|---|---|
| 0 | 0 | 0 | 1 |
| 0 | 0 | 1 | 0 |
| 0 | 1 | 0 | 0 |
| 0 | 1 | 1 | 0 |
| 1 | 0 | 0 | 0 |
| 1 | 0 | 1 | 0 |
| 1 | 1 | 0 | 1 |
| 1 | 1 | 1 | 0 |

Figure 2:
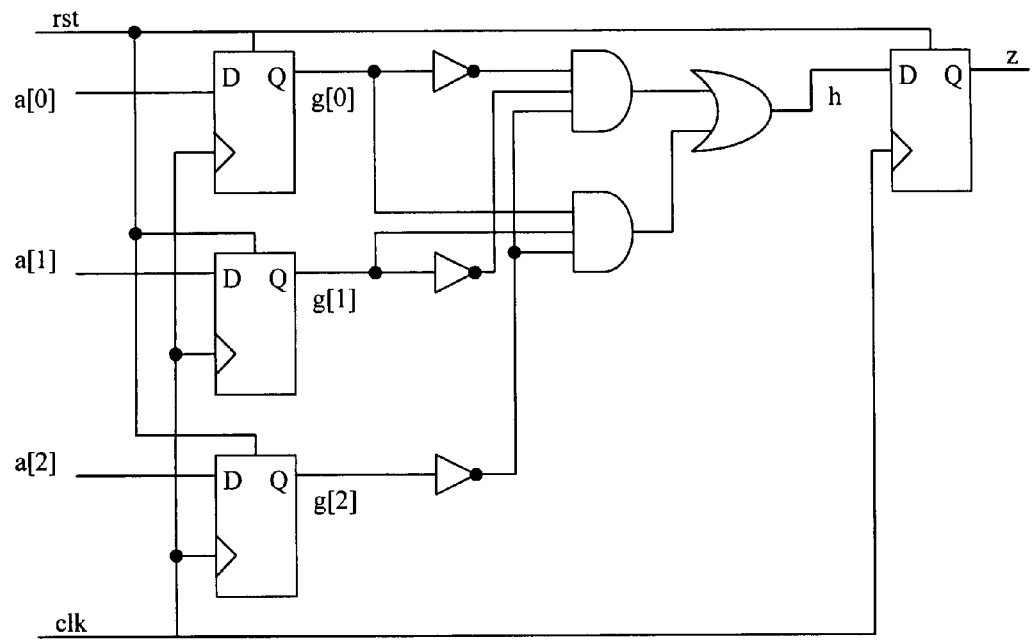
FIG. 2 illustrates the schematic view of the "simple_design".

After the standard RTL synthesis, the schematic view of the above design is shown in FIG. 2.

Figure 3A:
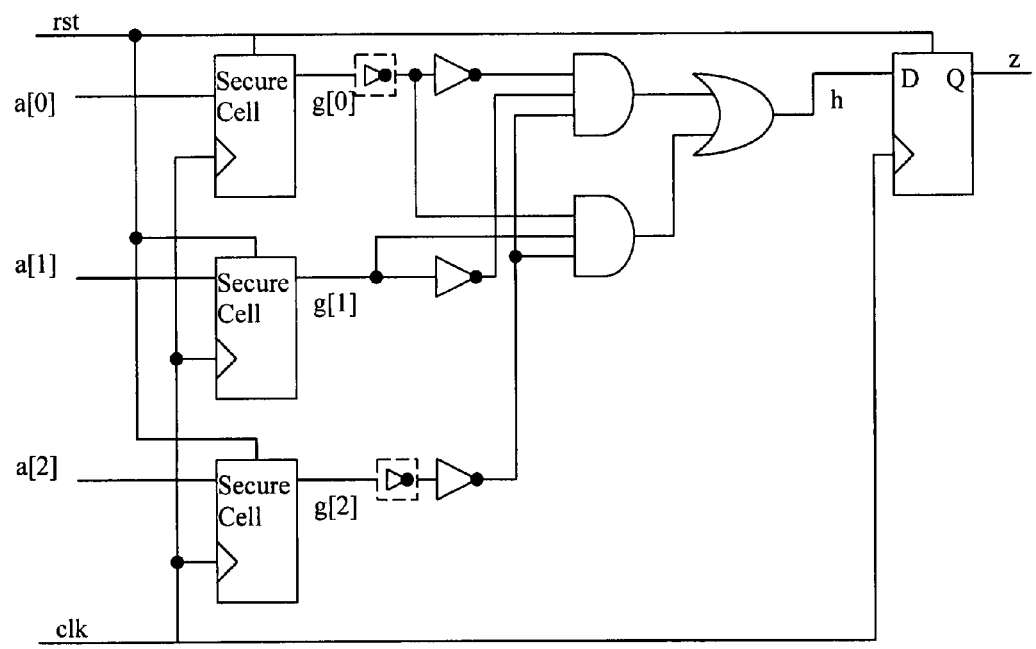
FIG. 3a is the schematics after inverters are inserted. The inverters in the dash boxes are inserted inverters.

The first step of the present invention is to select the "secure cells". For this example, registers g[0], g[1], and g[2] are selected as the "secure cells". The invention will do the following processes before the standard RTL synthesis: (a) mark a "secure attribute" onto the registers g[0], g[1], and g[2]; (b) randomly generate a 3-bit key, for example, 101, for g[0], g[1], and g[2]. We call this key the "real key"; (c) if we assume "1" means inversion (but "0" can also mean inversion), an inverter is inserted in the front of the g[0] and g[2], as shown as FIG. 3a. Then a netlist is synthesized.

Figure 3B:
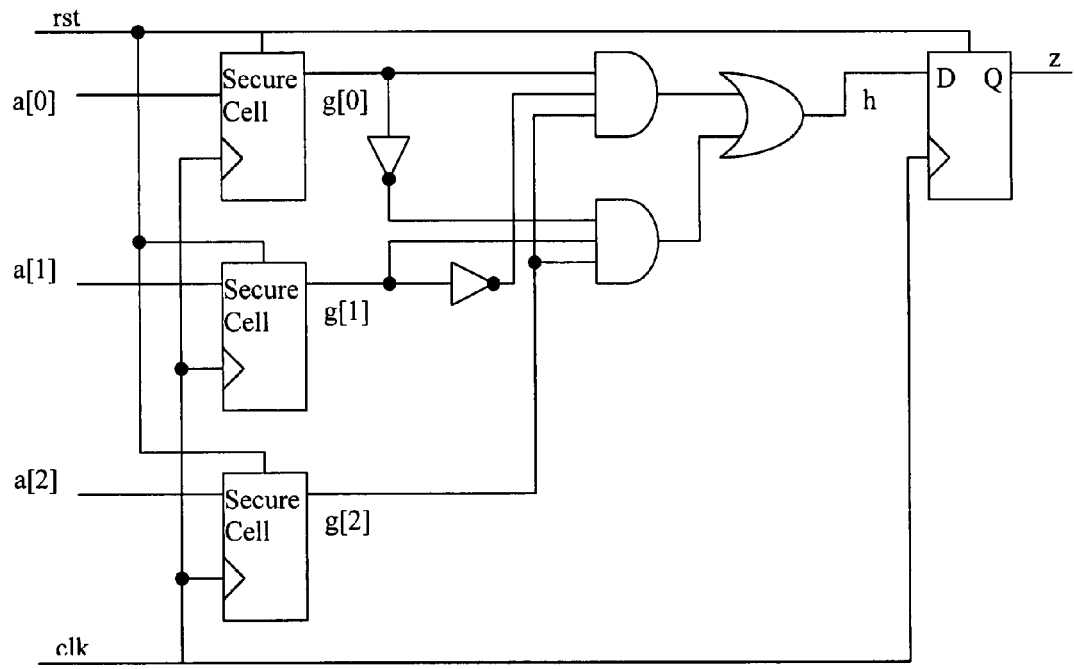
FIG. 3b is the schematics after synthesis. The inserted inverters are absorbed in the design.
Figure 3C:
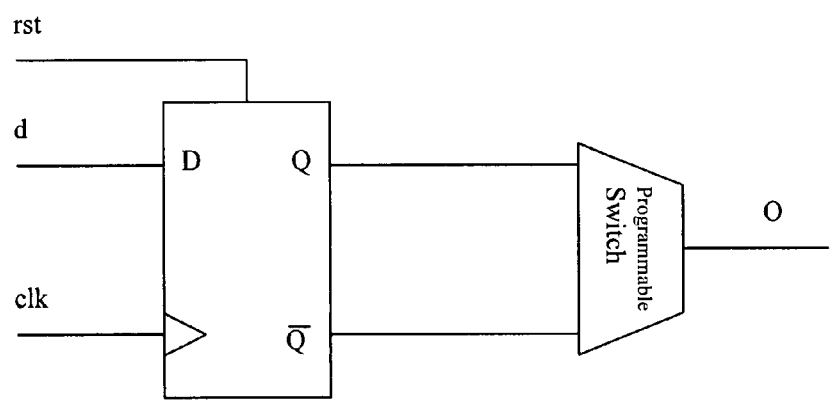
FIG. 3c is the schematics of a secure cell.

During the technology mapping, if any cell is marked as a "secure cell", it will be mapped to the secure cell in the technology library. The schematic view of the above secure design is shown in FIG. 3b. The schematic of a secure register is shown in FIG. 3c.

At each stage of the IC design, the netlist needs to be extracted for verification, normally in a HDL Verilog or VHDL format. With the presented secure feature, the netlist extractor needs to be modified. In the modified netlist extractor, the "secure cells" will be extracted as normal cells with the same functionality, and output connections will be dependent on the injected key. For the above example, if the "real key", 101, is injected into the netlist extractor, the netlist extracted is as shown in FIG. 3d, where, for each bit of the register, if the key bit is "1", the output is connected to "$\overline{Q}$", and if the key bit is "0", the output is connected to "Q".

Figure 3D:
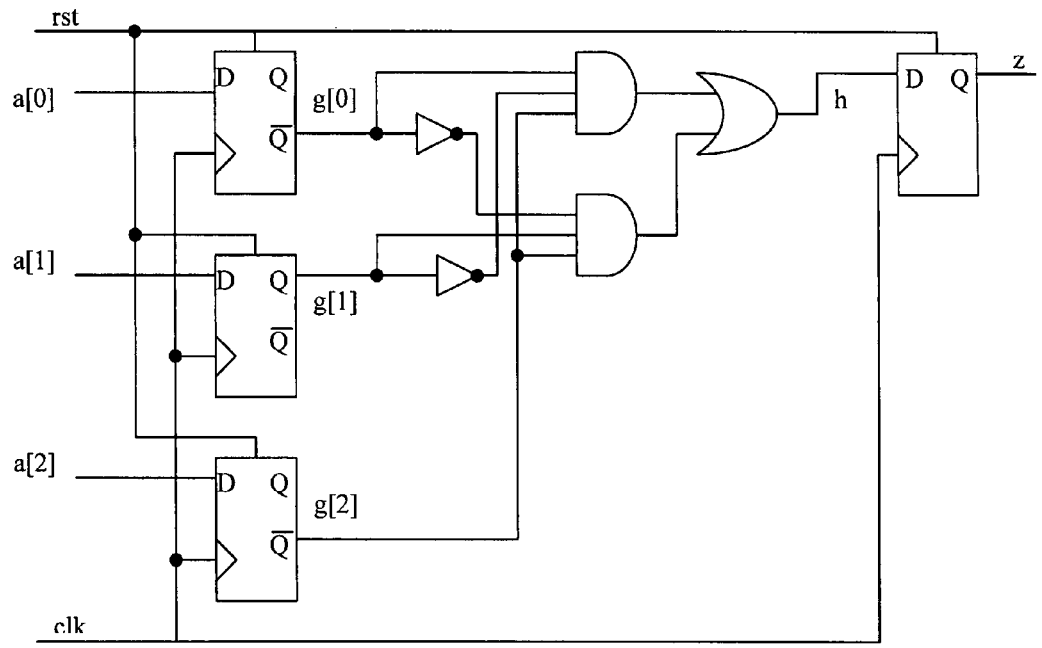
FIG. 3d is the schematics after the secure cells are configured.

The extracted file, which is by represented FIG. 3d, could be used for simulation (compared with the golden vectors), or for formal verification with the original netlist.

Figure 3E:
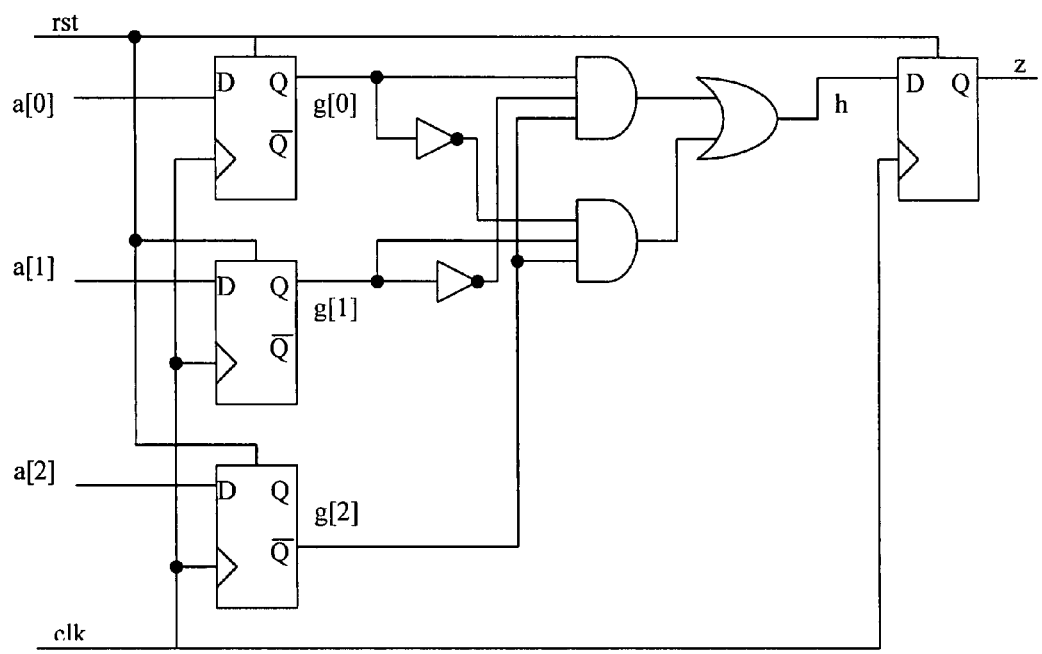
FIG. 3e is the schematics after the secure cells are configured with faked key.

After the verification has passed, to protect the design after the synthesis, a random "fake key", say, 001, is injected into the netlist extractor. A fake netlist (secure netlist) will be generated, as shown as FIG. 3e. This netlist could be used as the golden netlist for the on-going design processes, which won't be effected by others in the same company or the third party.

To re-simulate the secure netlist file, using the input vectors of the golden vectors as input vectors for the simulation, the output vectors will be updated as follows:

| a[0] | a[1] | a[2] | z |
|---|---|---|---|
| 0 | 0 | 0 | 0 |
| 0 | 0 | 1 | 0 |
| 0 | 1 | 0 | 1 |
| 0 | 1 | 1 | 0 |
| 1 | 0 | 0 | 1 |
| 1 | 0 | 1 | 0 |
| 1 | 1 | 0 | 0 |
| 1 | 1 | 1 | 0 |

The above vectors will be used as the golden simulation vectors for the on-going processes of the IC design.

The mapped netlist (usually, edif or db) will be used for the physical synthesis and manufacturing. The mapped netlist contains "secure cells", in which each "secure cell" has a programmable switch. The "fake key", "fake netlist", and "fake golden simulation vectors" will be used for the verification and testing during the physical synthesis and manufacturing.

The third party only has the information indicated in the last immediate paragraph. The "real key" and "real golden simulation vectors" will never be released to the third party. To crack the programmable switches, or to crack the "real key", is as difficult as cracking the AES and DES of the same bit-width. To crack the "secure cells" from the "fake netlist" is not possible. For the above example, the third party only sees the logic function of "h", shown in FIG. 3d, as:

h=g[0] & !g[1] & g[2]\!g[0] & !g[1] & g[2];

Because some literals will be shown as both positive and negative phases, it is not possible for the hacker to know its original phase. However, we need to be prudent when we select the "secure cells". For example, the counter registers cannot be selected as the "secure cells" because the hacker can easily reason the input phase from the secure logic function. Normally, symmetric logic inputs should not be the candidates of "secure cells". Contrarily, the finite state machine state registers or the glue logic input registers are very good candidates for "secure cells".

The only one keeping the "real key" is the IP designer, or IP creator. When the chip is returned from the foundry, the "real key" will be injected, and the "programmable switch" in the "secure cells" will be reprogrammed before shipping the chip to the end users. Therefore, before the final switch is programmed, the chip does not function correctly.

Figure 4:
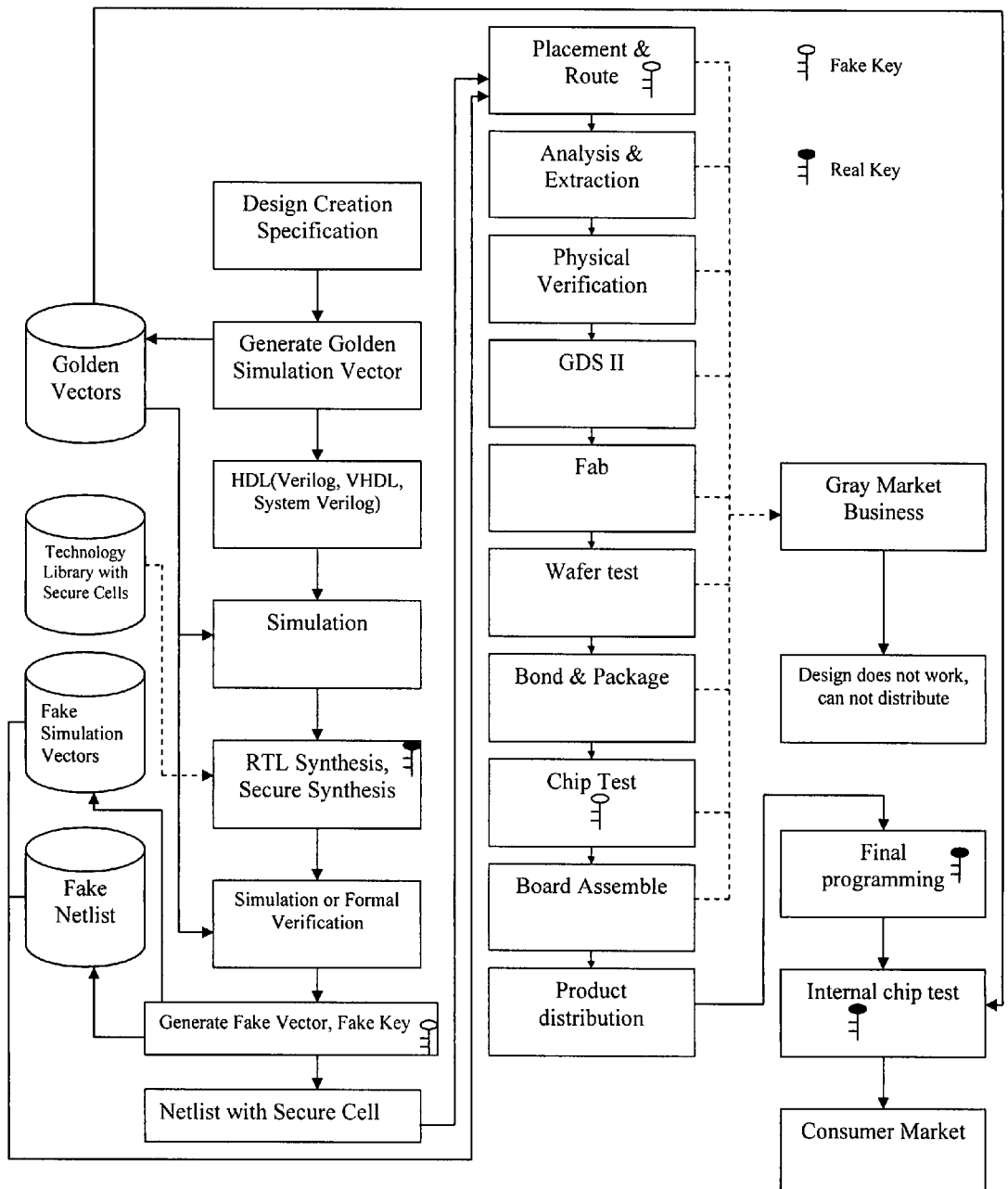
FIG. 4 illustrates the secure solutions of the present invention for the IC chip design flow.

The overall flow of the present invention for secure designs is shown in FIG. 4.

Because the third party only has the "fake simulation vector", there will be no way for them to even deduce the behavior of the chip.

After the chips are shipped to the end users, the hackers may try to reverse engineer the chip. The methods of attacking the ASIC chip involve expensive equipments and tools [2], including: (a) Cleanly imaging and etching away successive layers of a device and post-processing the images to render clean polygon images of the circuits. This technique was employed to reverse engineer an Intel 80386 chip in two weeks; (b) Building on the techniques in (a), software developed by Chipworks Inc. can automatically generate circuit schematics from the polygon images.

Figure 5:
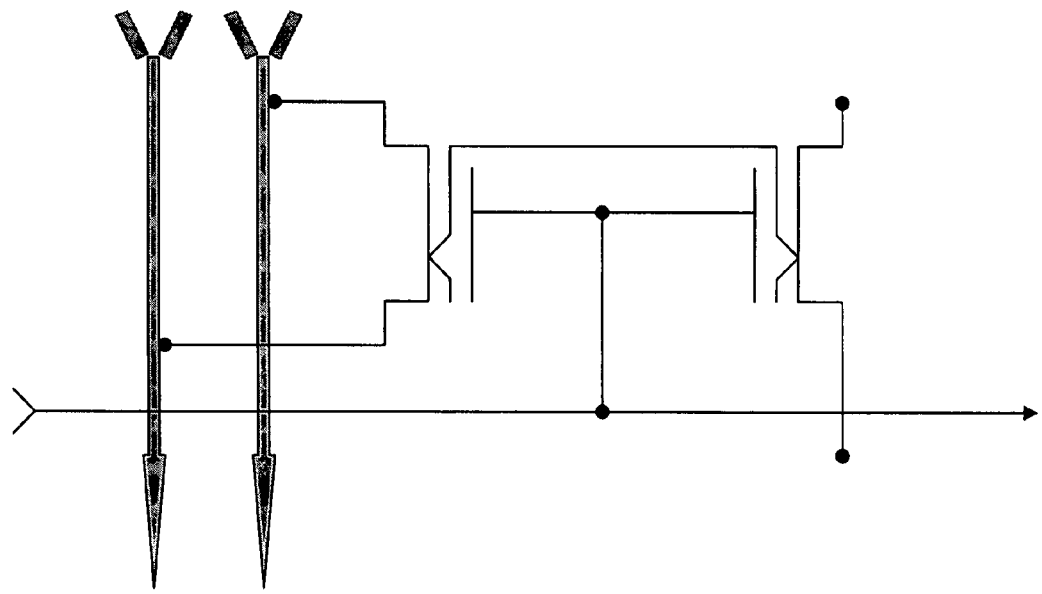
FIG. 5 illustrates a flash switch.

The technology indicated in the last immediate paragraph cannot attack the present invention because: (a), reverse engineering the circuit still cannot make the chip functionally correct, and the "fake netlist" is open any way; and (b), directly attacking the flash switches is not possible [3]. The flash-based switches are used to connect or disconnect intersecting metal lines. A single floating gate is charged or discharged to set the state of a switch that connects two metal lines, as shown as FIG. 5. The only change after the device is programmed is the number of electrons on the floating gates. There is no physical change in the programming device or switch device, so there is nothing to be detected by any material analysis. Because there is no observable change in the flash-based switch after it has been programmed, a flash-based switch is very difficult to reverse engineer.

Figure 6:
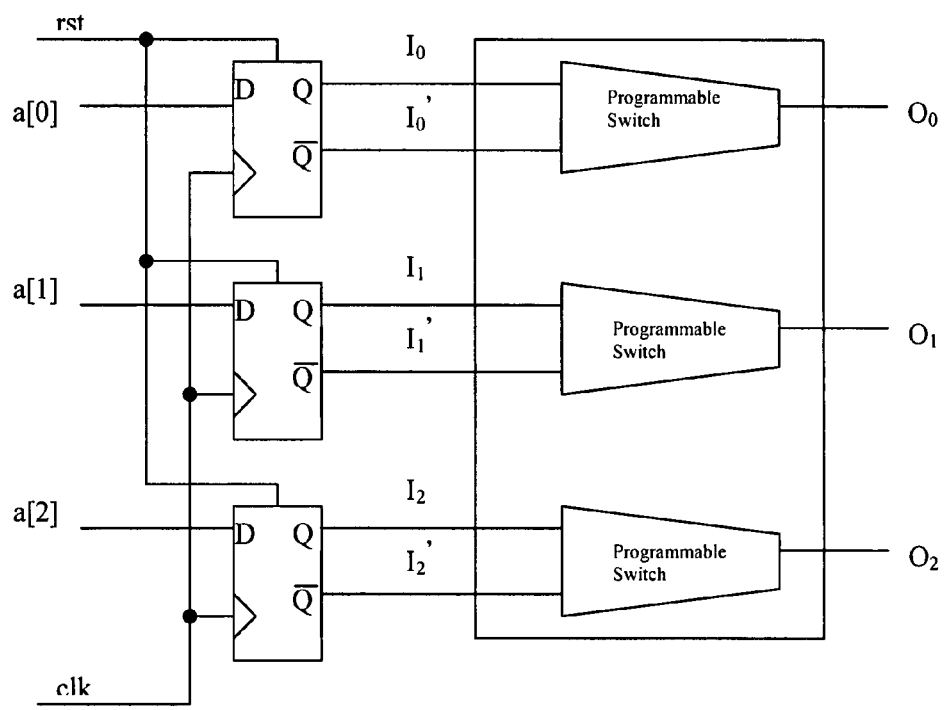
FIG. 6 illustrates a key box.

In a variation on this embodiment, the "secure cells" are the normal flip-flops, or gates. The "programming switches" are embedded into a so-called "key box". When randomly selecting each register to be inverted or not, an artificial hierarchy (or "key box") will be created. The inputs of the "key box" are "Q" and "$\overline{Q}$" of the registers, and the outputs of the "key box", say "O", will be connected to the original driven cells of the registers. The "key box" schematic is shown in FIG. 6. Each bit of the "key box" is a programmable switch. If a register is selected as "inverted", "$\overline{Q}$" will be connected to "O". If the register is not selected as "inverted", "Q" is connected to "O". The "key box" connection pattern is defined as the "key".

CONCLUSION

Compared with known IC design secure methodologies, the presented invention has the following new features: (a), it will not increase the chip area and power consumption, and will not reduce the chip performance if the timing-driven "secure cell" selection scheme is used, because a "free" encryption and decryption is used; (b), it can protect the RTL netlist right after it has signed off, no matter where it is outsourced for its physical synthesis, to the third parties or inside the same company.

The data structures and code described in the foregoing description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Furthermore, the foregoing descriptions of embodiments of the present invention have been presented only for purposes of illustration and description. They are not intended to be exhaustive or to limit the present invention to the forms disclosed. Accordingly, many modifications and variations will be readily apparent. Additionally, the above disclosure is not intended to limit the present invention. The scope of the present invention is defined by the appended claims.

What is claimed is:

1. A method to enhance the electronic design automation software to protect IC design or IC design IP from leaking to market from outsourced GDSII file, without adding encryption hardware, comprising of:

Electronic design automation software selecting a set of registers, a set of input ports, and a set output ports of the IC logic designs to be protected, where each set can be empty, and marking all selected items as secure elements, from the IC logic design software data base;

Generating a bit for each item marked as secure and, defining whether 0 or 1 value of a bit represents inversion, and the bits generated are called real key;

Inserting inverters to each item marked as secure if the corresponding generated bit represents inversion; if the item marked as secure is a register or an input, inserting an inverter to the net it drives; if the item marked as secure is an output, inserting an inverter to the net that drives it;

Mapping all items marked as secure to secure gates during technology mapping of the IC logic design, where the secure gates are defined as followings: if an item marked as secure is a register, mapping it to a secure register which is a normal register with a reconfigurable switch box; if item marked as secure is an input port, adding a reconfigurable switch box driven by the input port and mapping the output of the switch box drives all nets driven by the original input port; if an item marked as secure is an output port, adding a reconfigurable switch box driving the output port and mapping the net driving the output port to drive the switch box;

Generating a so called fake key by randomly selecting a subset of the bits in the real key and revert the selected bits;

Generating a fake netlist by hardwiring the secure switch boxes to the corresponding bits in the fake key in the mapped netlist and using it to test during manufacturing;

Manufacturing the secure switches to programmable switches, such as, (but not limited to,) flash memory, anti-fuse switch, SRAM based switch, and pass-transistor;

Programming secure switches using the real key after manufacturing.

* * * * *